United States Patent
Davis

(10) Patent No.: US 9,714,725 B2
(45) Date of Patent: Jul. 25, 2017

(54) CABLE ADAPTER AND METHOD

(71) Applicant: Omaha Standard, LLC, Council Bluffs, IA (US)

(72) Inventor: Wayne Harry Davis, Lumberton, NJ (US)

(73) Assignee: Omaha Standard, LLC, Council Bluffs, IA (US)

( * ) Notice: Subject to any disclaimer, the term of this patent is extended or adjusted under 35 U.S.C. 154(b) by 0 days.

(21) Appl. No.: 14/940,451

(22) Filed: Nov. 13, 2015

(65) Prior Publication Data

US 2017/0138509 A1    May 18, 2017

(51) Int. Cl.
*E21F 17/02* (2006.01)
*F16L 3/10* (2006.01)
*B60P 1/36* (2006.01)

(52) U.S. Cl.
CPC ............ *F16L 3/1033* (2013.01); *B60P 1/36* (2013.01)

(58) Field of Classification Search
CPC ............ F16L 3/00; H01B 17/00; B60P 1/36
See application file for complete search history.

(56) References Cited

U.S. PATENT DOCUMENTS

| | | | |
|---|---|---|---|
| 1,533,724 A * | 4/1925 | Clarke-James | E04B 1/2604 292/300 |
| 5,203,668 A | 4/1993 | Marmur | |
| 5,246,330 A | 9/1993 | Marmur et al. | |
| 5,642,711 A | 7/1997 | Boner et al. | |
| 7,192,239 B2 | 3/2007 | Marmur et al. | |
| 7,278,816 B2 | 10/2007 | Marmur et al. | |
| 8,029,228 B2 | 10/2011 | Marmur | |
| 8,763,993 B2 * | 7/2014 | Bohler | B66C 1/34 254/390 |

* cited by examiner

*Primary Examiner* — Amy Sterling
(74) *Attorney, Agent, or Firm* — Hodgson Russ LLP

(57) ABSTRACT

An adapter for releasably attaching a cable end having an end fitting to a frame of a hoist apparatus at an attachment opening of the frame includes a pair of longitudinal arms connected by a transverse bridge, an attachment portion coupled to the pair of arms and spaced longitudinally from the bridge, and a gate member. The bridge has inner and outer faces connected by a side face, a longitudinal cable passageway through the inner and outer faces, and a cable insertion slot communicating with the cable passageway, wherein the insertion slot is open through the inner, outer, and side faces. The gate member is received by the insertion slot, and is selectively removable from the slot to permit transversely directed insertion of a portion of the cable end through the slot into the cable passageway such that the end fitting is opposed by the inner face of the bridge.

10 Claims, 3 Drawing Sheets

CABLE ADAPTER AND METHOD

FIELD OF THE INVENTION

The present invention relates generally to the field of roll-off cable hoisting mechanisms operable to load and unload containers such as waste receptacles with respect to vehicles such as truck bodies or trailer bodies.

BACKGROUND OF THE INVENTION

It is known to provide a truck body with a cable hoist apparatus for loading and unloading a container with respect to the truck body. In a common design, the truck body includes a frame assembly comprising stationary subframe and a top frame pivotally mounted on the subframe, and one or more hydraulic actuators are arranged to selectably tilt the top frame relative to the subframe for loading and unloading operations. The cable hoist apparatus works in conjunction with actuation of the top frame to pull a container onto the top frame during loading and controllably allow the container to roll off the top frame during unloading. An example of this common design is disclosed, for example, in U.S. Pat. No. 8,029,228 owned by the present applicant. In this type of cable hoist apparatus, it is necessary to attach an end of the hoisting cable to the top frame, which acts as a structural ground. As may be understood, the other end of the cable is releasably attached to the container.

FIG. 1A shows a front section of a top frame 12 to which a cable end 20 of a cable 18 is attached by a configuration widely used in the prior art. In the known configuration, a thimble 13 is arranged through an attachment opening 14 in frame 12, and the cable end 20 is looped around thimble 13 through attachment opening 14. As shown in FIG. 1A, the cable end is folded back to provide overlapping cable segments which are clamped together by a series of clamps 15. The cable 18 may be routed through a sheave 16 rotatably journalled on frame 12 as the cable makes its way to the container (not shown). This attachment configuration is effective to attach a cable that lacks an end fitting. However, cable 18 is prone to wear and must be replaced from time to time, and the prior art attachment arrangement shown in FIG. 1A is not user friendly when it comes time to replace cable 18. Specifically, the clamps 15 must be removed to allow the worn cable to be removed, a new cable must be routed through thimble 13, the cable length must be preset via the hydraulic actuating system and a come along device (i.e. a cable puller) to remove slack from the cable, and then the cable must be clamped by clamps 15. This is time consuming. More importantly, because attachment of cable end 20 to frame 12 is critical from a safety standpoint, the skill of the technician in attaching the new cable to frame 12 is important. If the new cable is not properly routed through thimble 13, or if the clamps 15 are not properly tightened, the attachment may fail. Such a failure has the potential to cause injury or death. For this reason, cable replacement is typically conducted only by skilled technicians trained in the replacement operation. Therefore, a skilled technician is forced to travel to a truck maintenance location, or the truck must be brought to a location where there is a skilled technician who can safely replace the cable. This introduces down time for the roll-off vehicle and adds cost to the cable replacement operation.

FIG. 1B shows another known arrangement for attaching an end 20 of a cable 18 to a frame 12. In the arrangement of FIG. 1B, cable end 20 is provided with an end fitting 22 which may a swage button end fitting or like fitting that is enlarged relative to the cable 18 and is securely fastened thereto. Cable end 20 is attached to frame 12 by a block 17 fastened to frame 12 by a plurality of fasteners 19. More specifically, a portion of cable end 20 is routed through a channel in block 17 such that an end face of end fitting 22 abuts with an opposing face of block 17. This prior art arrangement involves adapting the frame 12 for fastening block 17 by welding the fastening block 17 to the frame 12; an existing attachment opening in frame 12 is not utilized.

SUMMARY OF THE INVENTION

The invention provides an adapter for releasably attaching a cable end having an end fitting to a grounding structure (e.g. a frame) of a cable hoist apparatus at an existing attachment opening of the grounding structure. The adapter of the present invention avoids the need for a cumbersome and skill-demanding thimble-and-clamp arrangement, and does so without requiring modification of the grounding structure.

The adapter generally comprises a pair of longitudinal arms and a transverse bridge connecting the pair of arms, a gate member, and an attachment portion coupled to the pair of arms and spaced longitudinally from the bridge. The attachment portion is configured for attachment to the grounding structure at the attachment opening. The bridge has an inner face, an outer face, and a side face connecting the inner face and the outer face. The bridge further has a longitudinal cable passageway extending through the inner and outer faces thereof, and a cable insertion slot communicating with the cable passageway, wherein the cable insertion slot is open through the inner face, the outer face, and the side face. The gate member is removably received by the cable insertion slot, and is selectively removable from the cable insertion slot to permit transversely directed insertion of a portion of the cable end through the cable insertion slot and into the cable passageway such that a portion of the end fitting is opposed by the inner face of the bridge. The bridge and the gate member may include respective fastener holes, wherein the fastener hole of the gate member is aligned with the fastener hole of the bridge when the gate member is received by the cable insertion slot, whereby the gate member may be releasably secured in the cable insertion slot by a threaded fastener. The cable insertion slot may be arc-shaped from the side face of the bridge to the cable passageway, and the gate member may be arc-shaped to complement the shape of the cable insertion slot.

The invention encompasses an apparatus comprising a frame having an attachment opening therethrough, a front sheave rotatably journalled on the frame, a cable including a cable end having an end fitting that has a proximal end face and a distal end face, and an adapter including an attachment portion and a bridge spaced longitudinally from the attachment portion, wherein the bridge includes a longitudinal cable passageway and a cable insertion slot communicating with the cable passageway. The attachment portion of the adapter is attached to the frame at the attachment opening, a portion of the cable end extends through the cable passageway, the proximal end face of the end fitting faces toward the bridge, and the distal end face of the end fitting faces toward the attachment portion.

The invention also encompasses a method of attaching a cable end having an end fitting to a grounding structure having an attachment opening. The method comprises (i) attaching an adapter to the grounding structure at the attachment opening, wherein the adapter includes a cable insertion slot communicating with a longitudinal cable passageway;

(ii) transversely inserting a portion of the cable end through the cable insertion slot and into the cable passageway such that a proximal end face of the end fitting opposes a face of the adapter; and (iii) closing the cable insertion slot. Step (i) of attaching the adapter may be performed before or after step (ii) of transversely inserting the portion of the cable end.

BRIEF DESCRIPTION OF THE DRAWING VIEWS

The nature and mode of operation of the present invention will now be more fully described in the following detailed description of the invention taken with the accompanying drawing figures, in which.

DETAILED DESCRIPTION OF THE INVENTION

Figure 2:
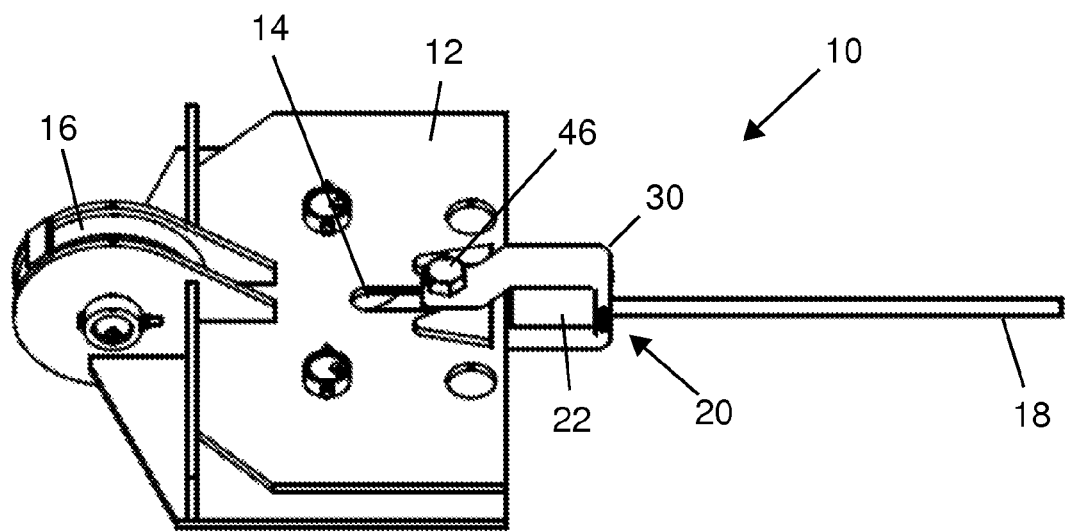
FIG. 2 is a perspective view showing an arrangement for attaching a cable end having a swage button end fitting to a cable hoist frame utilizing an adapter formed in accordance with an embodiment of the present invention.

FIG. 2 illustrates a cable hoist apparatus 10 utilizing an adapter 30 formed in accordance with an embodiment of the present invention. Cable hoist apparatus 10 may be part of a roll-off truck body equipped to hoist a container onto the truck body for transport and unload the container from the truck body at an intended location. For example, cable hoist apparatus 10 may comprise a subframe and a top frame pivotally mounted on the subframe as taught by U.S. Pat. No. 8,029,228. FIG. 2 shows only a front portion of cable hoist apparatus 10, wherein a front section 12 of the top frame is visible. Frame front section 12 is conventional in that it includes an attachment opening 14 extending therethrough, and has a front sheave 16 rotatably journalled thereon. Cable hoist apparatus 10 also comprises a cable 18 including a cable end 20 having a swage button end fitting 22. As will be explained in detail below, adapter 30 is useful to releasably attach cable end 20 to frame 12 in a manner that simplifies and expedites replacement of cable 18. In the context of the present invention, frame 12 may be considered a "grounding structure" to which cable end 20 is attached.

Attention is directed also now to FIGS. 3-6 illustrating adapter 30 in greater detail. In the depicted embodiment, adapter 30 comprises pair of longitudinal arms 32, 34 and a transverse bridge 36 connecting the pair of arms 32, 34. In the context of the present specification, the term "longitudinal" refers to a direction of tensioned cable 18 (see FIG. 2), and the term "transverse" refers to any direction orthogonal or substantially orthogonal to the longitudinal direction.

Adapter 30 also comprises an attachment portion 38 coupled to arms 32, 34 and spaced longitudinally from bridge 36 to define an internal space 40. Attachment portion 38 is configured for attachment to frame 12 at attachment opening 14. For example, attachment portion 38 may include a pair of aligned fastener holes 42, 44 extending transversely through the pair of arms 32, 34, such that the attachment portion 38 of adapter 30 may be attached to frame 12 by a threaded fastener 46 as shown in FIG. 2. As shown in the figures, the pair of arms 32, 34 extend parallel to one another from bridge 36 and then converge toward one another as they approach attachment portion 38. Advantageously, a distance D between respective end portions of arms 32, 34 is chosen to be approximately the same as a thickness of frame 12 adjacent attachment opening 14, such that the adapter 30 is held in place on frame 12 as it is being installed. Threaded fastener 46 may include a nut (not shown) and a mating bolt.

Figure 3:
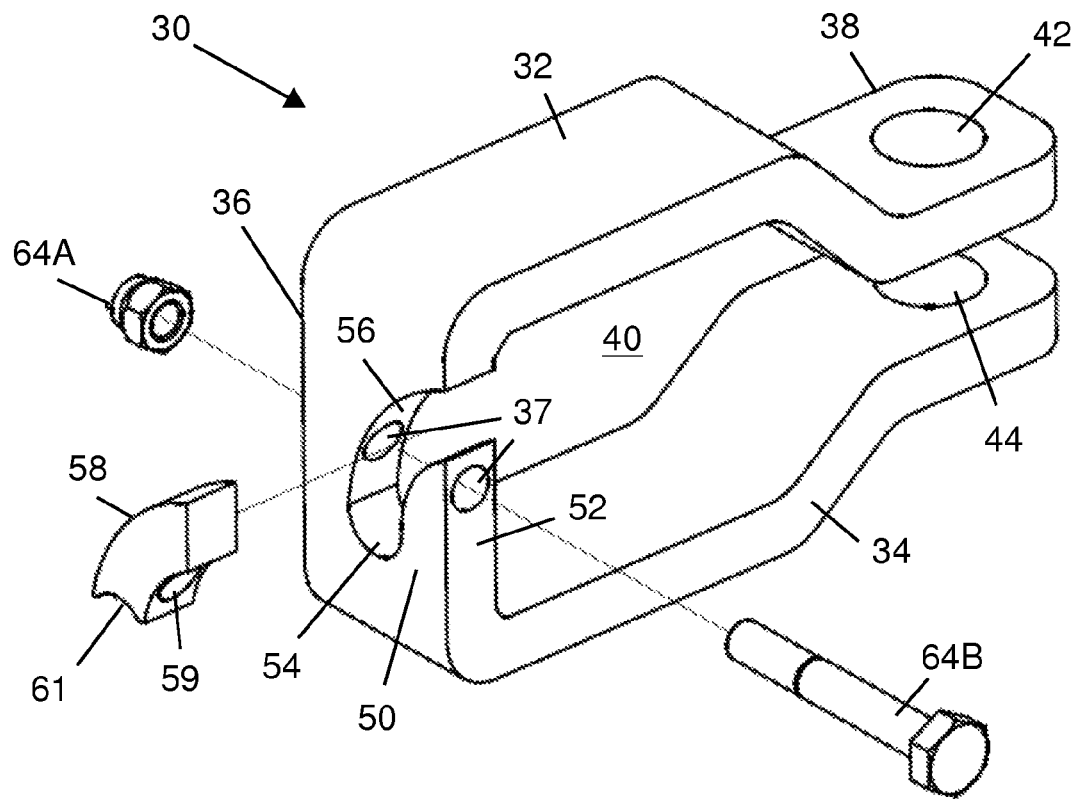
FIG. 3 is an exploded perspective view of the adapter shown in FIG. 2.
Figure 4:
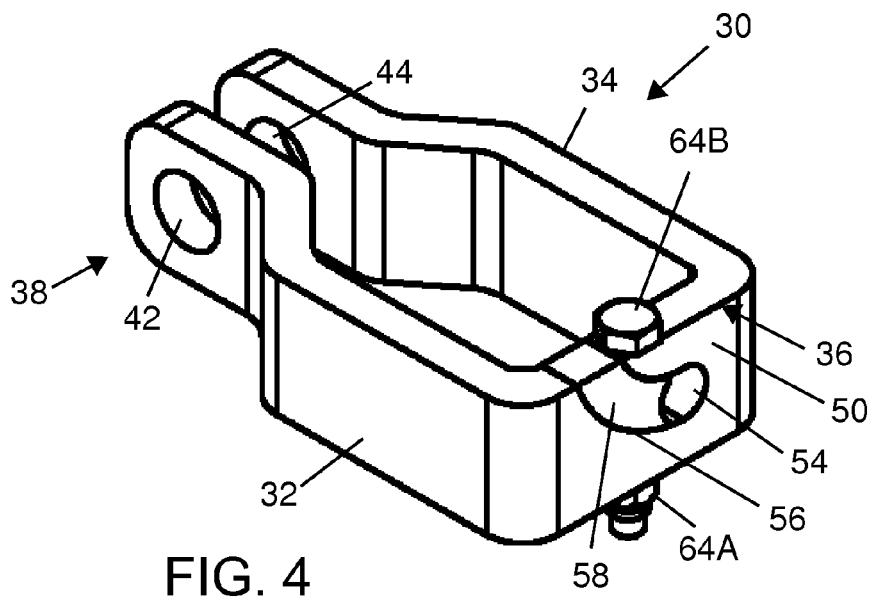
FIG. 4 is a perspective view of the adapter shown in FIG. 2.
Figure 5:
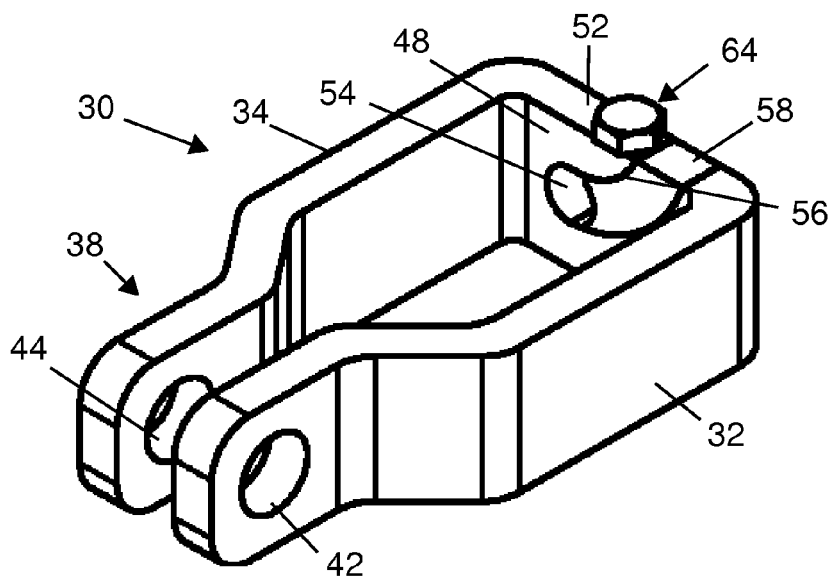
FIG. 5 is another perspective view of the adapter shown in FIG. 2.

Bridge 36 has an inner face 48, an outer face 50, and a side face 52 connecting inner face 48 and outer face 50. Bridge further has a longitudinal cable passageway 54 extending through inner face 48 and outer face 50, and a cable insertion slot 56 communicating with cable passageway 54. As best seen in FIGS. 3-5, cable insertion slot 56 is open through inner face 48, outer face 50, and side face 52. Cable passageway 54 may be embodied as a cylindrical passageway having a diameter that is less than a diameter of swage button end fitting 22. Cable insertion slot 56 may be arc-shaped from side face 52 to cable passageway 54, although cable insertion slot 56 is not limited to an arc-shaped configuration.

Figure 6:
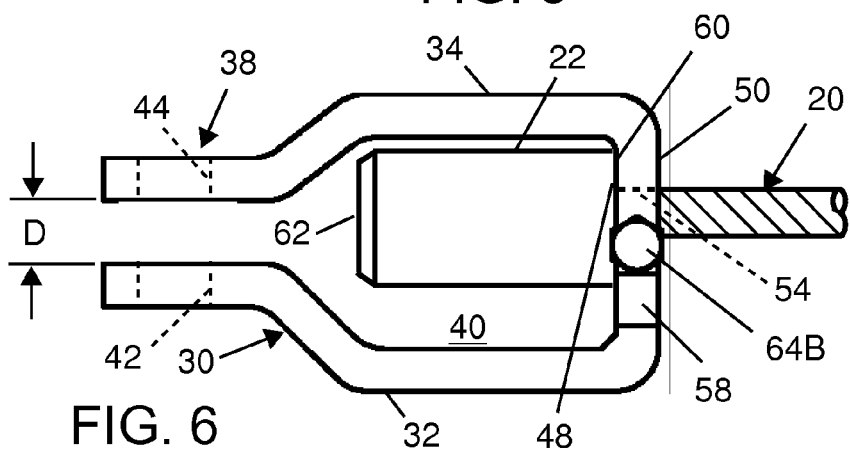
FIG. 6 is a side elevation view of the adapter shown in FIG. 2, wherein a swage button end fitting of a cable end is shown being held by the adapter.

Adapter 30 further comprises a gate member 58 removably received by cable insertion slot 56. Gate member 58 is selectively removable from cable insertion slot 56 to permit transversely directed insertion of a portion of cable end 20 through cable insertion slot 56 and into cable passageway 54. The arc shape of cable insertion slot 56 is advantageous because it helps retain the inserted portion of cable end 20 through bridge 36 while gate member 58 is installed in slot 56, and it avoids a sharp right-angle turn as slot 56 leads to cable passageway 54 to facilitate cable insertion and prevent damage to the cable from a sharp edge. As may be seen in FIG. 6, such transversely directed insertion allows swage button end fitting 22 to be received within internal space 40 such that a proximal end face 60 of swage button end fitting 22 opposes inner face 48 of bridge 36, thereby preventing the swage button end fitting from being withdrawn in a longitudinal direction from internal space 40. As shown in FIG. 6, a distal end face 62 of swage button end fitting 22 faces toward attachment portion 38. Bridge 36 and gate member 58 may include respective fastener holes 37 and 59, wherein fastener hole 59 of gate member 58 is aligned with fastener hole 37 of bridge 36 when gate member 58 is received by cable insertion slot 56 such that gate member 58 may be releasably secured in cable insertion slot 56 by a threaded fastener 64 extending through the aligned holes 37, 59. Threaded fastener 64 may comprise a nut 64A and a mating bolt 64B. As shown in FIGS. 3-5, gate member 58 may be arc-shaped to complement the shape of cable insertion slot 56, such that the proper orientation of gate member 58 is readily apparent to a user. In the depicted embodiment, gate member 58 has a cylindrical end surface 61 complementary to a cylindrical surface of cable passageway 54 to accommodate a portion of cable end 20 leading to swage button end fitting 22.

Arms 32, 34 and bridge 36 may be integrally formed as one piece by machining or casting metal. Gate member 58 may or may not be formed from the same material. The specific material(s) chosen for making adapter 30 may vary depending on load requirements.

Figure 1A:
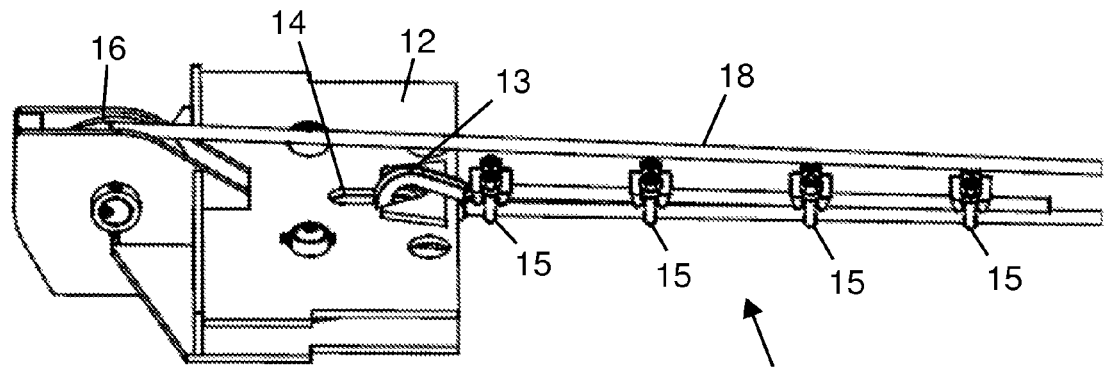
FIG. 1A is a perspective view showing a well-known prior art arrangement for attaching a cable end to a cable hoist frame of a roll-off truck body.
Figure 1B:
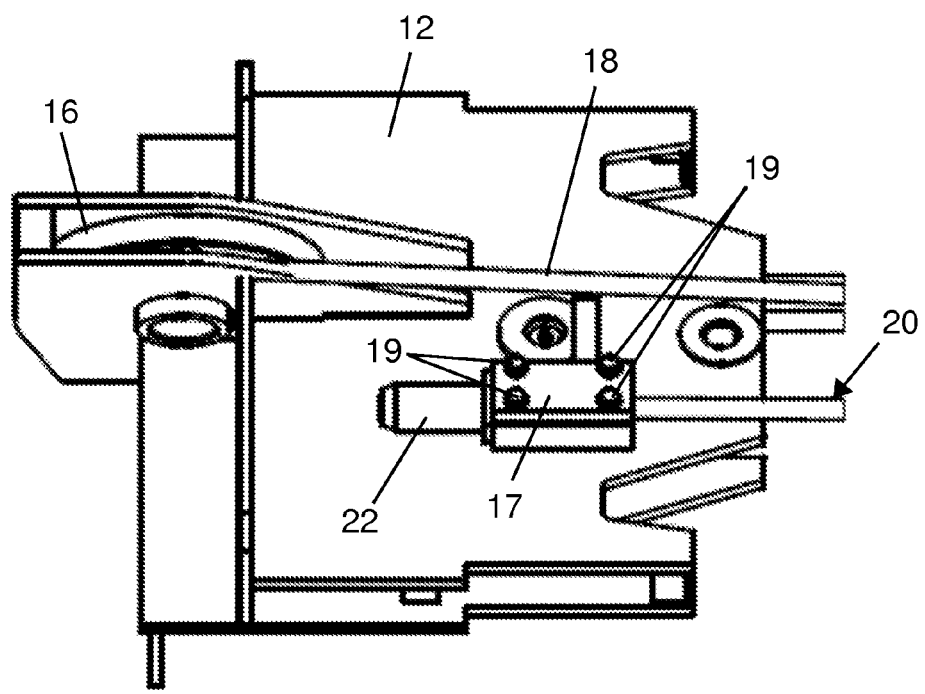
FIG. 1B is a perspective view showing another arrangement of the prior art for attaching a cable end to a cable hoist frame, wherein the cable end has a swage button end fitting.

As may be understood, adapter 30 significantly reduces the time and effort involved in replacing cable 18 when compared to prior art arrangements using a thimble and clamps (FIG. 1A) or a fixed block attachment (FIG. 1B). The invention encompasses an improved method of attaching cable end 20 having swage button end fitting 22 to a grounding structure (e.g. frame 12) having an attachment opening 14. The method comprises the step of attaching an adapter 30 to the grounding structure at attachment opening 14, wherein the adapter 30 includes a cable insertion slot 56 communicating with a longitudinal cable passageway 54. The method further comprises the step of transversely inserting a portion of the cable end 20 through the cable insertion slot 56 and into the cable passageway 54 such that a proximal end face 60 of the swage button end fitting 22 opposes a face 48 of the adapter 30. Finally, the method comprises the step of closing the cable insertion slot 56. The cable insertion slot 56 may be closed by installing a gate member 58 in the cable insertion slot. The step of attaching the adapter may be performed before or after the step of transversely inserting a portion of the cable end 20. Adapter 30 is configured to take advantage of the existing attachment opening 14 commonly provided in roll-off top frame designs for receiving a thimble.

While the adapter of the present invention is described above with regard to a cable end having a swage button end fitting, the adapter of the present invention may be used to attach cable ends having other types of end fittings that are enlarged relative to the cable proper. For example, cable ends having a steel sleeve end fitting or any other type of enlarged end fitting may be attached using an adapter made according to the present invention. As used herein, the term "cable" is used in a broad sense to include traditional cable as well as wire rope.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. An adapter for releasably attaching a cable end having an end fitting to a grounding structure having an attachment opening therethrough, the adapter comprising:
    a pair of longitudinal arms and a transverse bridge connecting the pair of arms;
    a gate member; and
    an attachment portion coupled to the pair of arms and spaced longitudinally from the bridge, the attachment portion being configured for attachment to the grounding structure at the attachment opening;
    wherein the bridge has an inner face, an outer face, and a side face connecting the inner face and the outer face;
    wherein the bridge further has a longitudinal cable passageway extending through the inner and outer faces thereof, and a cable insertion slot communicating with the cable passageway, wherein the cable insertion slot is open through the inner face, the outer face, and the side face;
    wherein the gate member is removably received by the cable insertion slot;
    wherein the gate member is selectively removable from the cable insertion slot to permit transversely directed insertion of a portion of the cable end through the cable insertion slot and into the cable passageway such that a portion of the end fitting is opposed by the inner face of the bridge; and
    wherein the bridge and the gate member include respective fastener holes, wherein the fastener hole of the gate member is aligned with the fastener hole of the bridge when the gate member is received by the cable insertion slot, whereby the gate member is releasably secured in the cable insertion slot by a threaded fastener.

2. The adapter according to claim 1, wherein the cable passageway is a cylindrical passageway and the end fitting is a swage button end fitting, wherein the cable passageway has a diameter less than a diameter of the swage button end fitting.

3. The adapter according to claim 2, wherein the gate member has a cylindrical end surface complementary to a cylindrical surface of the cable passageway.

4. The adapter according to claim 1, wherein the cable insertion slot is arc-shaped from the side face to the cable passageway.

5. The adapter according to claim 4, wherein the gate member is arc-shaped to complement the shape of the cable insertion slot.

6. The adapter according to claim 1, wherein the pair of arms extend parallel to one another from the bridge and converge toward one another as they approach the attachment portion.

7. The adapter according to claim 1, wherein the attachment portion includes a pair of aligned fastener holes extending transversely through the pair of arms.

8. An apparatus comprising:
    a frame having an attachment opening therethrough;
    a front sheave rotatably journalled on the frame;
    a cable including a cable end having an end fitting, the end fitting having a proximal end face and a distal end face;
    an adapter including an attachment portion and a bridge spaced longitudinally from the attachment portion, wherein the bridge includes a longitudinal cable passageway and a cable insertion slot communicating with the cable passageway;
    wherein the attachment portion of the adapter is attached to the frame at the attachment opening, a portion of the cable end extends through the cable passageway, the proximal end face of the end fitting faces toward the bridge, and the distal end face of the end fitting faces toward the attachment portion.

9. The apparatus according to claim 8, wherein the adapter further includes a gate member removably received by the cable insertion slot.

10. The apparatus according to claim 8, wherein the attachment portion of the adapter is releasably attached to the frame by a fastener extending through the attachment opening.

\* \* \* \* \*